United States Patent [19]

Horvath

[11] Patent Number: 4,551,798
[45] Date of Patent: Nov. 5, 1985

[54] MULTIPLE CONTROL STORES IN A PIPELINED MICROCONTROLLER FOR HANDLING NESTER SUBROUTINES

[75] Inventor: Carlos F. Horvath, West Chester, Pa.

[73] Assignee: Burroughs Corporation, Detroit, Mich.

[21] Appl. No.: 438,703

[22] Filed: Nov. 3, 1982

[51] Int. Cl.[4] .......................... G06F 9/32; G06F 9/42
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,909,797 | 9/1975 | Goss et al. | 364/200 |
| 4,008,462 | 2/1977 | Kanda | 364/200 |
| 4,027,291 | 5/1977 | Tokura et al. | 364/200 |
| 4,155,120 | 5/1979 | Keefer | 364/200 |
| 4,179,731 | 12/1979 | Yamazaki | 364/200 |
| 4,210,960 | 7/1980 | Borgenson | 364/200 |
| 4,253,142 | 2/1981 | Bavoux et al. | 364/200 |
| 4,348,721 | 9/1982 | Brereton et al. | 364/200 |
| 4,390,946 | 6/1983 | Lane | 364/200 |
| 4,439,827 | 3/1984 | Wilkes | 364/200 |
| 4,467,415 | 8/1984 | Ogawa | 364/200 |

Primary Examiner—Eddie P. Chan
Attorney, Agent, or Firm—Mervyn L. Young; Kevin R. Peterson

[57] ABSTRACT

A microcontroller for controlling a digital device which controller is formed of a plurality of control stores each of which is provided with a register counter to address different locations within corresponding control store. Each control store is accessed each clock cycle and an instruction register is provided to receive one of the fetched microinstructions from the selected control store. In this manner, a microinstruction is presented to the instruction register each clock cycle even though the previous microinstruction was a conditional branch, a jump to subroutine or a return to subroutine instruction. In order to accommodate jump to subroutine and corresponding return from subroutine instructions, the respective address of the return subroutine is stored in a push-down stack for presentation to a selected one of the above-referred-to register counters in an order the reverse of the order in which those addresses were placed on the top of the stack.

13 Claims, 5 Drawing Figures

| Addr | JA | * | CONT. DATA |
|---|---|---|---|
| 1 | JA | * | CONT. DATA |
| 10 |  | K | D(10) |
| 11 | 75 | * | D(11) |
| 12 | – | – | – |
| 13 | – | – | – |
| 14 | 80 | * | D(14) |
| 15 | – | * | D(16) |
| 16 | 500 | * | D(16) |
| 90 | 400 | * | D(90) |
| 91 | 42 | * | D(91) |
| 100 | 300 | * | D(100) |
| 101 | 35 | * | D(101) |
| 300 | 8 | * | D(300) |

MEMORY (ROM)

JA = JUMP ADDRESS FIELD
* = INSTRUCTION FIELD
  JMP
  JMS
  RET
K = INSTRUCTION BEING EXEC.
D(A) = CONTROL DATA FIELD (AT LOC. A)

*Fig. 3*

| INST. TYPE | REGISTER PRESENT STATE | | | REGISTER NEXT STATE | | | REGISTER ACTION | | | REGISTER SOURCE SELECT | | | INSTR. REG. SOURCE | STACK SOURCE SELECT |
|---|---|---|---|---|---|---|---|---|---|---|---|---|---|---|
| | A R | B R | C R | A R | B R | C R | A A | B A | C A | A S | B S | C S | I S | Z S |
| NA | J | S | C | J | S | C | L | 0 | I | C | 0 | 0 | C | 0 |
| · | J | C | S | J | C | S | L | I | 0 | B | 0 | 0 | B | 0 |
| · | C | J | S | C | J | S | I | L | 0 | 0 | A | 0 | A | 0 |
| · | C | S | J | C | S | J | I | 0 | L | 0 | 0 | A | A | 0 |
| · | S | J | C | S | J | C | 0 | L | I | 0 | C | 0 | C | 0 |
| · | S | C | J | S | C | J | 0 | I | L | 0 | 0 | B | B | 0 |
| JMS | J | S | C | C | J | S | I | L | 0 | 0 | A | 0 | A | B |
| · | J | C | S | C | S | J | I | 0 | L | 0 | 0 | A | A | C |
| · | C | J | S | S | C | J | 0 | I | L | 0 | 0 | B | B | C |
| · | C | S | J | S | J | C | 0 | L | I | 0 | C | 0 | C | B |
| · | S | J | C | J | C | S | L | I | 0 | B | 0 | 0 | B | A |
| · | S | C | J | J | S | C | L | 0 | I | C | 0 | 0 | C | A |
| RET | J | S | C | J | C | S | L | I | L | B | 0 | Z | B | 0 |
| · | J | C | S | J | S | C | L | L | I | C | Z | 0 | C | 0 |
| · | C | J | S | S | J | C | L | L | I | Z | C | 0 | C | 0 |
| · | C | S | J | S | C | J | L | I | L | Z | 0 | B | B | 0 |
| · | S | J | C | C | J | S | I | L | L | 0 | A | Z | A | 0 |
| · | S | C | J | C | S | J | I | L | L | 0 | Z | A | A | 0 |
| JMP | J | S | C | C | S | J | I | 0 | L | 0 | 0 | A | A | 0 |
| · | J | C | S | C | J | S | I | L | 0 | 0 | A | 0 | A | 0 |
| · | C | J | S | J | C | S | L | I | 0 | B | 0 | 0 | A | 0 |
| · | C | S | J | J | S | C | L | 0 | I | C | 0 | 0 | B | 0 |
| · | S | J | C | S | C | J | 0 | I | L | 0 | 0 | B | C | 0 |
| · | S | C | J | S | J | C | 0 | L | I | 0 | C | 0 | C | 0 |

*Fig. 5*

MULTIPLE CONTROL STORES IN A PIPELINED MICROCONTROLLER FOR HANDLING NESTER SUBROUTINES

RELATED U.S. APPLICATIONS

Ser. No. 438,702, filed Nov. 3, 1982 by Carlos F. Horvath and entitled "Multiple Control Stores For A Pipelined Microcontroller".

Ser. No. 438,701, filed Nov. 3, 1982 by Carlos F. Horvath and entitled "Multiple Control Stores In A Pipelined Microcontroller For Handling Jump And Return Subroutines".

FIELD OF THE INVENTION

This invention relates to a pipelined microcontroller and more particularly to such a controller employing multiple control stores for parallel operation so as to reduce loss of cycle times.

DESCRIPTION OF THE PRIOR ART

Microprogramming is the technique of replacing a macroinstruction decoding logic in a processor with a memory in which are stored the various control signals required to enable the respective gates in the processor so as to execute the different macroinstructions. These control signals may be totally encoded, partially encoded or unencoded depending on the desired word length of the corresponding microinstructions. The macroinstruction operator then serves as an address to the control store or microinstruction memory. Such a microprogramming technique allows for great flexibility in architectural design as the type of control signals that can be generated are not rigidly fixed for any particular processor and may be chosen to emulate or interpret a host of different higher level program languages even though these languages may have been designed for a mainframe computer of a particular manufacturer. Because of this flexibility of design, almost all medium and small processing systems and particular microprocessors employ this technique.

However, the accessing and reception of the macroinstruction from control store requires more time than the same macroinstruction operator can be decoded by a decoder logic circuit. Thus, larger and faster processor designs tend to favor hardwired logic decoders.

A particular technique for improving the speed or reducing the clock times required for microinstruction execution has been that of pipelining or overlapping the fetch of the macroinstruction operator (microinstruction address) with the execution of the preceding microinstruction. This technique is illustrated in the Ferguson et al U.S. Pat. No. 3,886,523.

However, even with this overlapping technique, there are still sequences of clock times when the microcontroller is not being employed due to a change in the routine being executed. That is to say, data processors do not execute a single sequence of instructions either to macroinstruction level or the microinstruction level. Periodically, the occurrence of an internal condition or an external condition requires the instruction sequence to branch to another routine to provide the proper response to that condition. In addition, many routines are made up of a series of nested subroutines which require the processor to jump to a subroutine and then return from the subroutine at some different location than the parent routine that was being executed. With a pipelined microcontroller such as described above, this requires that the new subroutines be fetched and the current sequence being executed is discarded again resulting in lost cycle times.

It is then an object of the present invention to provide an improved microcontroller for a data processor which minimizes the loss of clock cycles.

It is another object of the present invention to provide an improved microcontroller for a data processor which provides for the overlap of instruction fetches and conditional branch instruction fetches.

It is still another object of the present invention to provide an improved microcontroller for a data processor which overlaps jump to subroutine instructions and return from subroutine instructions with the fetch of current fetch instructions.

SUMMARY OF THE INVENTION

In order to achieve the above-identified objects, the present invention is directed toward a microcontroller for controlling a digital device which controller is formed of a plurality of control stores each of which is provided with a register counter to address different locations within corresponding control store. Each control store is accessed each clock cycle and an instruction register is provided to receive one of the fetched microinstructions from the selected control store. In this manner, a microinstruction is presented to the instruction register each clock cycle even though the previous microinstruction was a conditional branch, a jump to subroutine or a return to subroutine instruction.

In order to accommodate jump to subroutine and corresponding return from subroutine instructions, the respective address of the return subroutine is stored in a push-down stack for presentation to a selected one of the above-referred to register counters in an order the reverse of the order in which those addresses were placed on the top of the stack.

A feature then of the present invention resides in a microcontroller having a plurality of memories for the presentation of a plurality of microinstructions to an instruction register each clock cycle so that the instruction register can receive an appropriate microinstruction each clock cycle.

BRIEF DESCRIPTION OF THE DRAWINGS

The above and other objects and advantages and features of the present invention will become more readily apparent from a review of the following specification when taken in review with the drawings wherein:

FIG. 3 is a diagram of a sequence of instructions representing a program segment as executed by the present invention;

FIG. 5 is a truth table illustrating the operation of the present invention.

GENERAL DESCRIPTION OF THE INVENTION

The present invention is adapted to provide control signals, either encoded or unencoded, to activate various gates and registers in the microprogram data processor during each clock cycle of operation. As was indicated above, prior art microprogram devices lose clock cycles each time there is a conditional branch instruction encountered or either a jump to a subroutine or return to subroutine instruction is encountered.

Figure 1:
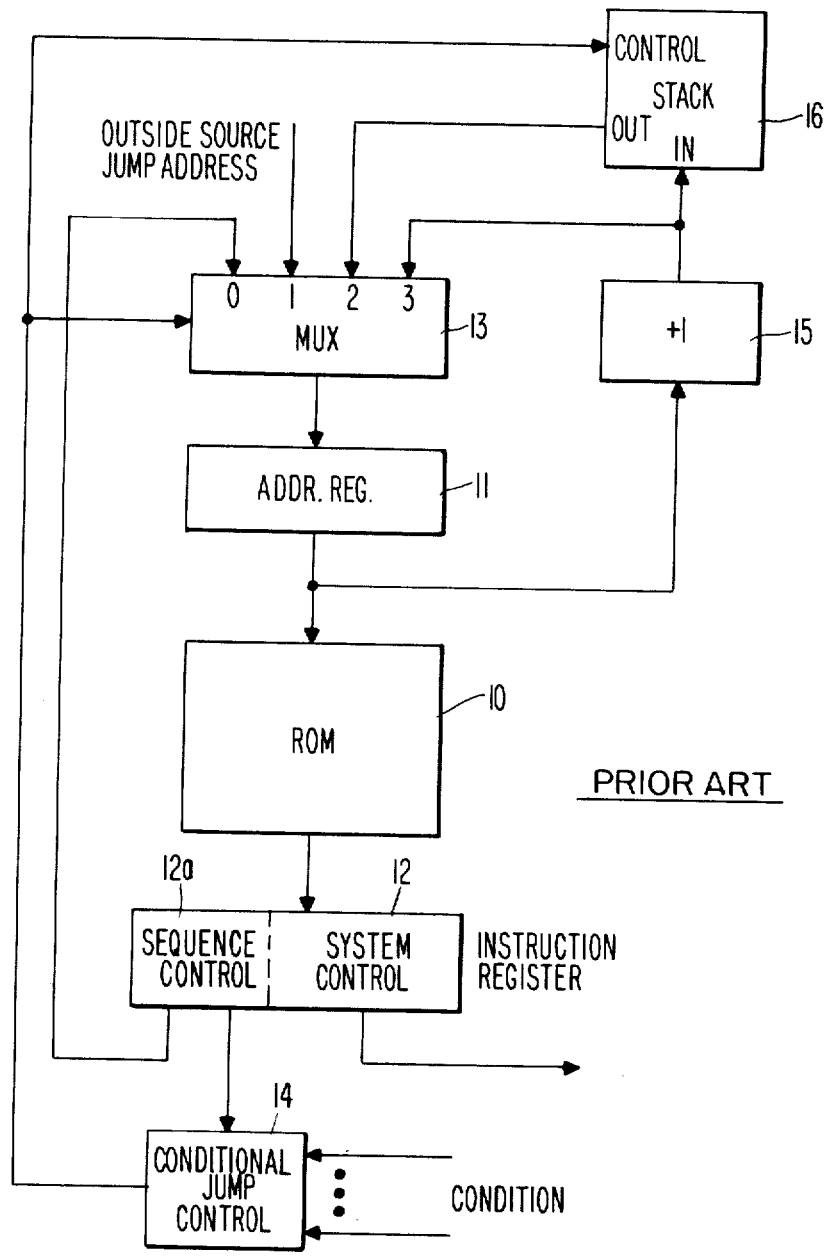
FIG. 1 is a schematic diagram of a microcontroller of the prior art.

Such a prior art microprogram controller is illustrated in FIG. 1. As shown therein, corresponding microinstructions are stored in control store 10 which may be just a read-only memory (ROM). As will be more thoroughly discussed below, each microinstruction includes a field of control signals which may be fully encoded, partially encoded or unencoded. In addition, each microinstruction includes a sequence field which specifies whether the current microinstruction is to be succeeded by the next microinstruction in sequence or is either a conditional branch instruction, jump to subroutine instruction, or return from subroutine instruction. This field also includes an alternate jump or return address.

When the control store 10 is addressed by the current address in address register 11, the corresponding microinstruction is read out in parallel to instruction register 12 from which the field is then employed to activate or enable the digital device being controlled such as an arithmetic logic unit and so forth. During the same clock cycle, sequence control field 12a provides an alternate address to multiplexor 13 in case a conditional branch or jump to subroutine instruction is being executed. If a conditional branch instruction is being executed, conditional jump control 14 detects whether the associated condition is true or false and, if true, signals multiplexor 13 to transfer the alternate address provided thereto to address register 11.

A particular feature that exists in many data processors both at the macroinstruction level and the microinstruction level is the employment of a push-down stack or a first in-last out set of registers. Such a stack is particularly useful since a procedure may jump to a subroutine and require the storing of a return address, the subroutine in turn may jump to another subroutine requiring a return address and so forth. With subroutines nested in this manner, each time a jump to a subroutine occurs, the return address is placed on top of the stack and subsequently "pushed" down as additional return addresses are entered into the top of the stack. As the various subroutines are exited, the necessary return addresses are provided from the top of the stack in the reverse order in which they were entered. Such a stack for a microprogram controller is illustrated in FIG. 1 as control stack 16. When the current microinstruction being executed out of instruction register 12 is a return from subroutine instruction, the appropriate address is provided from control stack 16 to address register 11 by way of multiplexor 16.

The microcontroller as illustrated in FIG. 1 is of the type wherein the control store address is fetched in an overlapped manner with the execution of the previously fetched microinstruction, and this is accomplished in the controller of FIG. 1 during the normal sequencing of instruction executions by incrementing the contents of address register 11 each time it is supplied to control store 10. In this manner, instruction register 12 is provided with a new microinstruction each clock cycle. However, it will be appreciated that when a conditional branch, jump to subroutine, or return from subroutine instruction is encountered, the contents of address register 11 must be replaced before the appropriate actions can be executed and this results in the loss of clock cycles.

Figure 2:
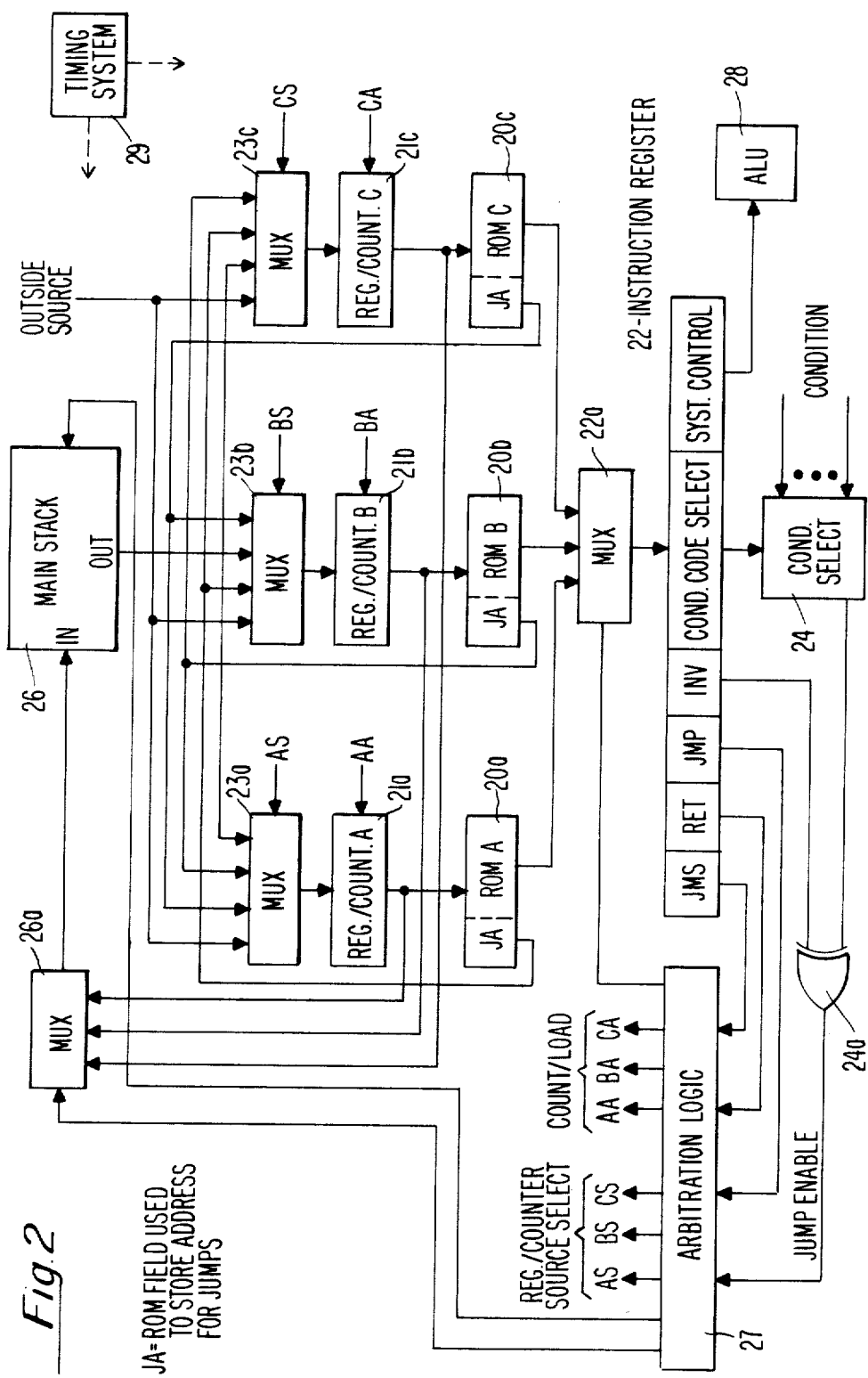
FIG. 2 is a schematic diagram of a microcontroller of the present invention.

In order to reduce the number of clock cycles lost, the present invention is adapted to supply a control store output to the instruction register each clock cycle in the manner shown in FIG. 2. In FIG. 2, three different control stores 20a, 20b, 20c are provided which stores are adapted to provide fields of control signals along with sequence information to instruction register 22 by way of multiplexer 22a. However, the jump addresses JA, which may also be used for conditional branch and return from subroutine instructions can be provided to each of the register counters 21a, 21b, and 21c except to the register counter corresponding to the individual control store 20a, 20b or 20c. To this end, each of the register counters 21a, 21b 21c, is provided with a multiplexor 23a, 23b, 23c respectively, to select which of the jump addresses from the other control stores are to be received and also to select whether or not top of stack addresses are to be received from main stack 26 in the case of a return from subroutine instruction. As shown in FIG. 2, each register counter also can receive a next address from an outside source as does the prior art controller of FIG. 1.

Which input is selected by each of multiplexors 23a, 23b, 23c is determined by the output from arbitration logic 27 in accordance with the sequence information supplied to the instruction register 22 from the control store currently selected.

Each of the control stores 20a, 20b, 20c is provided with the same set of microinstructions. However, at any particular time, each individual control store will be employed in a different one of three modes depending upon the count load information supplied to the corresponding register counter 21a, 21b, 21c from arbitration logic 27. These three modes are PROGRAM COUNTER REGISTER, JUMP ADDRESS REGISTER, and TOP OF STACK REGISTER. Associated with each of these registers is a two bit register which serves as a tag register and the value loaded into the corresponding tag register determines the state or designation of the corresponding register counter. Since register counters are now employed in place of address register 11 of FIG. 1, incrementor 15 of FIG. 1 is not required.

In a manner that will be more fully described below, the three control stores 20a, 20b, and 20c can continue to provide fields of control information to instruction register 22 each clock cycle even though the microinstruction currently being executed is a condition branch instruction, a jump to subroutine instruction or a return from subroutine instruction. That is to say, if register counter 21a has been designated as the program counter register, it will continue to address control store 20a, and increment its own contents until a branch, jump or return instruction is indicated in instruction register 22. During this time, one of registers 21b and 21c will be designated as the jump address register and the other as the top of stack register so that all three control memories 20a, 20b, 20c are each providing a microinstruction to multiplexor 22a. The three microinstructions being fetched are for the current program count address, a jump address and a top of stack or return from subroutine address and one of the microinstructions will be selected by the arbitration logic 27 for presentation to instruction register 22 each clock cycle.

DETAILED DESCRIPTION OF THE INVENTION

FIG. 3 represents a sequence of microinstructions as they might exist in the respective control stores or ROMs as employed in the present invention. As illustrated therein, the first field represents a jump address JA which specifies the address of the next microinstruction to be executed if the current microinstruction requires a conditional branch, jump to subroutine or return from subroutine. The second field denoted by an asterisk is the instruction field which includes that number of bits necessary to specify a branch, jump or return or, if none of these, the sequencing of the register counter serving as the program counter register.

A more detailed example of a typical microinstruction is shown in FIG. 2 by the respective fields that make up the instruction register 22. It will be remembered that the jump addresses which are stored as a part of a microinstruction in the respective ROMs are not supplied to the instruction register. The instruction field shown therein includes a one bit jump to subroutine field, a one bit return from subroutine field, a one bit jump or conditional branch field and a one bit inversion field which when a zero enables exclusive OR gate 24a to transmit a jump enable signal to arbitration logic 27 from condition select register 24. The condition code select of instruction register 22 contains that number of bits necessary to select one of any of the condition signals supplied to condition select logic 24. The remaining field in instruction register 22 as in the sequence of microinstructions illustrated in FIG. 3, contains the control signals employed to activate the digital device under control. If all the bits of the instruction field of the microinstruction are zero, then the program counter register will continue to increment through the sequence of instructions as shown in FIG. 3.

If a particular register counter is designated as the PROGRAM COUNTER REGISTER, then it will increment by one at each successive clock thus fetching instructions in its corresponding ROM in a sequential fashion. If a particular register counter is designated as a JUMP ADDRESS REGISTER then it will hold that address of the instruction to which the next branch must be taken provided the condition tested requires it. If a particular register counter is designated as the JUMP ADDRESS REGISTER, it is loaded at each clock so that the instruction to which a branch might be taken is always present at the output of the corresponding ROM. Finally, if a particular register counter is designated as the TOP OF STACK REGISTER, then it will contain the return address of the calling program which caused it to be loaded with this address in the first place. The TOP OF STACK REGISTER is loaded only when a PUSH instruction is encountered. In this case, the old contents of this register are transferred to main stack 26 of FIG. 2. This register counter always holds the contents of the top most element of the main stack. If, however, a return instruction is encountered the instruction register can be loaded immediately with the contents of the address to which the return is specified; this is of course made possible by the TOP OF STACK REGISTER fetching the contents of the return location.

Perhaps a better understanding of how the present invention provides a microinstruction, each clock cycle, to the instruction register 22 (of FIG. 2) can be obtained from examples of what takes place in the various register counters and the resulting output of their corresponding ROMs in FIG. 2 for different sequences of microinstructions as shown in FIG. 3. For example, assume that microinstruction 10 of FIG. 3 is currently being executed and that register 21c of FIG. 2 has been designated as the PROGRAM COUNTER REGISTER, register counter 21b has been designated as the JUMP REGISTER and register 21a has been designated as the TOP OF STACK REGISTER. The control field and instruction field of microinstruction 10 will now reside in instruction register 22, register counter 21c will be incremented to hold the address of instruction 11, register counter 21b will now hold the jump address field of microinstruction 10 (for example, let this jump address be 100) and register counter 21a will now hold the top of stack address (for example, the contents of this register will be 90). The outputs of ROM 20c will be the control data field and instruction field of instruction 11 with the jump address thereof (75) being supplied to multiplexor 23b of FIG. 2. The output of ROM 20b will be the control data field and instruction field of instruction 100 and its jump address (300) will be suppllied to multiplexor 23c of FIG. 2. The output of ROM 20a will be the control data field and instruction field of microinstruction 90 and its jump address (400) will be supplied to both multiplexors 23b and 23c.

If microinstruction 10 were a jump instruction, register counter 21b now becomes the PROGRAM COUNTER REGISTER, instruction register 22 will now contain the control data field and instruction field of microinstruction 100, the jump address (300) is supplied to the register counter 21c that is now the JUMP ADDRESS REGISTER and the contents of register counter 21a are unaffected. The output of ROM 20c is now the control data field and instruction field of instruction 300 and its jump address (8) is supplied to multiplexor 23b. The output of ROM 20b is now the control data field and instruction field of microinstruction 101 and its jump address (35) is supplied to multiplexor 23c. The output of ROM 20a remains unchanged.

If microinstruction 10 were a jump to subroutine instruction, register counter 21b now becomes the PROGRAM COUNTER REGISTER and its contents (100) are incremented by one and the contents of instruction register 22 become the control data field and instruction field of instruction 100. Register counter 21a now becomes the JUMP ADDRESS REGISTER and contains the jump address (300) of microinstruction 100 while register counter 21c now becomes the TOP OF STACK REGISTER and retains its contents (11). The output of ROM 20b are now the control data field and instruction field of microinstruction 101 the jump address (35) of which is transmitted to multiplexor 23a. Register counter 21a now contains the jump address of microinstruction 100 (300) and the output of register counter 21a is the control data field and instruction field of instruction 300, the jump address (8) of which is transmitted to multiplexor 23b. The output of ROM 20c remains the same. In the meantime, the previous contents of register 21a (which were specified as 90) are placed on top of main stack 26 by way of a multiplexor 26a.

If microinstruction 10 were a return from subroutine instruction, register 21a now becomes the PROGRAM COUNTER REGISTER and will be incremented by one. Instruction register 22 now contains the control data field and instruction field of instruction 90, the output of ROM 20a will be the control data field and instruction field of instruction 91 whose jump address is being supplied to multiplexor 21b. Register counter 21b becomes the JUMP ADDRESS REGISTER and the output of ROM 20b will be the respective control data field and instruction field and jump address of the previous microinstruction. The contents of register counter 21c which is now the TOP OF STACK REGISTER, will contain the previous top of stack address and the output of ROM 20c will contain the microinstruction contents of the microinstruction at that address.

The logic that drives the allocation of the register counters is contained in arbitration logic 27 of FIG. 2. This logic is nothing more than a state machine. The two bit registers 27a, b and c (See FIG. 4) associated with each of the register counters are located in this logic. The signals that drive this logic originate from the instruction register 22 of FIG. 2 and condition select unit 24 of FIG. 2. The outputs of arbitration logic 27 are illustrated in more detail in FIG. 4. These outputs drive the data/address multiplexors 23a, 23b and 23c and the load/count enable inputs to the three register counters 21a, 21b and 21c.

Figure 4:
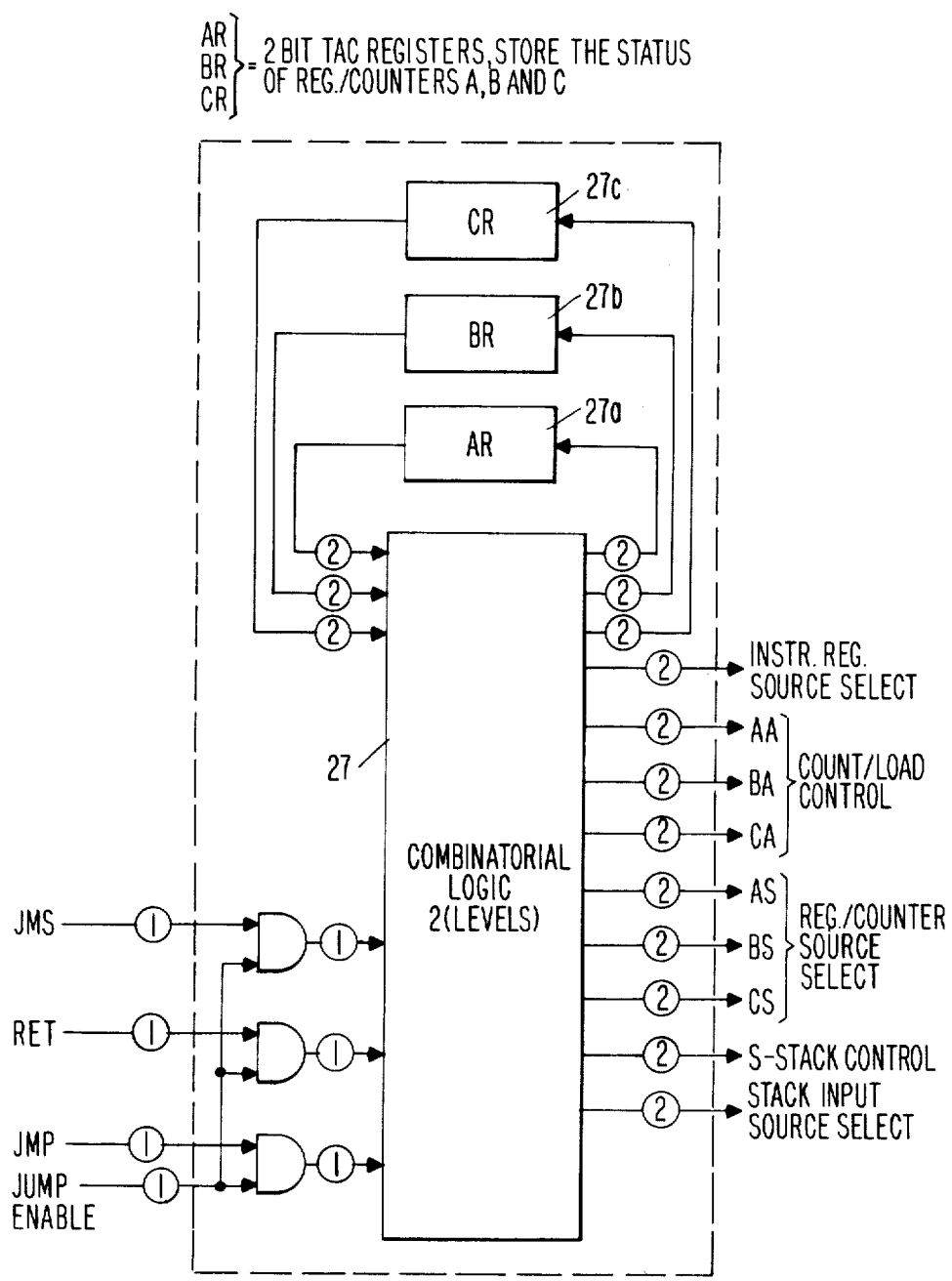
FIG. 4 is a schematic diagram of the arbitration logic as employed in the present invention.

As was indicated above, arbitration logic 27 of FIGS. 2 and 4 is in essence a state machine and, for each combination of states or modes of the three register counters 21a, 21b and 21c as well as the type of instruction being executed, there is a corresponding next state for the register counters as well as corresponding register and source select actions. A precise description of the behavior of respective registers and ROMs of the present invention as controlled by arbitration logic 27 of FIGS. 2 and 4 is shown in the table of FIG. 5 which depicts the inputs and outputs of arbitration logic 27 as well as the present state and next state of each register counter.

The first column of FIG. 5 represents the instruction types currently being executed which include no-action NAi in which the present register counter designated as the PROGRAM REGISTER COUNTER continues incrementation, jump to subroutine JMS, return from subroutine RET and jump or conditional branch JMP. The second column represents the various combinations of modes of the respective register counters where A designates register counter 21a of FIG. 2, B represents register counter 21b and C represents register counter 21c. The respective modes of the different register counters are indicated by J for JUMP ADDRESS REGISTER, S for TOP OF STACK REGISTER and C for PROGRAM COUNTER REGISTER. The third column represents the succeeding state or mode of the respective register counters.

The fourth column represents the action taking place in each of the register counters where L indicates that the register counter is being loaded with a new address, O indicates that the register counter keeps its current contents and I indicates that the register counter is being incremented. The fifth column indicates which ROM or control store is the source of the new address being supplied to the register counter being loaded. The sixth column indicates which ROM is the source of the instruction and control data fields being loaded into instruction register 22 of FIG. 2 and the seventh column illustrates which register counter is the source, if any, of the address being placed on top of stack 26 of FIG. 2.

For example, consider the first combination of modes under a no-action (NA) type of instruction. AR equals J indicates that register counter 21a of FIG. 2 is in the JUMP ADDRESS REGISTER mode, register counter 21b is in the TOP OF STACK REGISTER mode and register counter 21c is in the PROGRAM COUNTER REGISTER mode. The next column of the same line indicates that the various register states or modes have not changed. The fourth column of that line indicates that register counter 21a is being loaded with a new address, register counter 21b retains its contents and that register counter 21c is being incremented. The fifth column indicates that register counter 21a is being loaded with a jump address from ROM 20c of FIG. 2. The sixth column IS of that line indicates that instruction register 22 of FIG. 2 is being loaded for ROM 20c and the last column of that line indicates that nothing is being placed on top of stack 26 of FIG. 2.

Another example of the action of the present invention may be given for the jump to subroutine instruction execution JMS in the first line of that catagory of the truth table in FIG. 5. Register counter 21a is in the JUMP ADDRESS REGISTER mode, register counter 21b is in the TOP OF STACK mode, and register 21c is in the PROGRAM COUNTER REGISTER mode. At the next clock time the respective states of the various register counters are that register counter 21a has become the PROGRAM COUNTER REGISTER, register counter 21b has become the JUMP ADDRESS REGISTER and register counter 21c has become the TOP OF STACK REGISTER. The next column indicates that register counter 21c has been incremented and register counter 21b has been loaded with a new address and the next column indicates that the source of that new address is ROM 20a. The next column indicates that instruction register 22 of FIG. 2 has been loaded from ROM 20a and the last column indicates that the contents of register 21b have been placed on top of stack 26 of FIG. 2.

From the above examples it is believed that the rest of the table of FIG. 5 will be apparent except perhaps to note that on the return from subroutine type of instructions RET, the Z's of column 5 indicate that the top of stack is the source for loading the respective register counters.

EPILOGUE

A microcontroller for a digital device has been disclosed which is adapted to provide a microinstruction to the corresponding instruction register each clock time from one of three different control stores or ROMs. In this manner, a microinstruction sequence can encounter a conditional branch to another subroutine, a jump to a subroutine and a return from a subroutine without any loss of clock cycles since the correct microinstruction required for the next clock cycle is always ready to be presented to the instruction register.

While but one embodiment of the present invention has been disclosed, it is apparent to those skilled in the art that variations and modifications may be made therein without departing from the spirit and scope of the invention as claimed.

What is claimed is:

1. A microcontroller for controlling a digital device, said microcontroller comprising:
   a plurality of control memories each for storing a set of microinstructions, each microinstruction being formed of a control field for controlling said digital device, a jump address field specifying the location in other control memory of the next microinstruction to be executed should said each microinstruction be a jump to subroutine or return from subroutine instruction and an instruction field specifying whether that particular microinstruction is a jump microinstruction, return microinstruction, or requires neither action:
a plurality of address registers one for each control memory and containing the address of the next microinstruction to be fetched;
means for fetching said microinstructions from each of said control memories in every clock cycle;
an instruction register coupled to the respective memories and digital device for receiving the control field and instruction field of a microinstruction fetched from one of said control memories;
a multiplexor coupled between said instruction register to select the instruction field and control field of one of the microinstructions being fetched from said respective control memories;
interconnection means coupled between each of said control memories and the address registers of the other control memories for supplying a jump address to the address registers of the other control memories;
logic means coupled to said instruction field portion of said instruction register and to said address registers specifying one of said registers as a program counter and one of said address registers as a return from subroutine register;
means responsive to said logic means to increment said program counter and to keep said return from subroutine register current contents; and
push-down stack means coupled to said plurality of address registers to receive one or more return from subroutine addresses in a first-in last-out manner to accommodate the execution of a series of nested subroutines.

2. A microcontroller according to claim 1 wherein:
said logic circuit means specifies different address register as a program counter according to whether the microinstruction currently being executed is a jump to subroutine microinstruction or a return from subroutine microinstruction.

3. A microcontroller according to claim 1 wherein:
said address registers are coupled to said push-down stack means so that the currently specified return from subroutine register serves as the first location in said stack means as a top of stack register.

4. A microcontroller according to claim 1 wherein:
each of said control memories contain the same sets of microinstructions.

5. A microcontroller according to claim 1 further including:
a plurality of multiplexors, one between each of said address registers and the jump address output of the other control memory, said multiplexors also being coupled to an outside source of microinstruction addresses.

6. A microcontroller according to claim 1 wherein:
each address register is a register counter that can be incremented to fetch, in order, a sequence of microinstructions from its corresponding control memory.

7. A microcontroller according to claim 1 further including:
timing means coupled to the respective registers and memories so that a microinstruction control field is supplied to said instruction register each clock time.

8. A microcontroller for controlling a digital device, said microcontroller comprising:
at least three control memories each for storing a set of microinstruction, each microinstruction being formed of a control field for controlling said digital device, a jump address field specifying the location in other control memory of the next mricroinstruction to be executed should said each microinstruction be a jump to subroutine or return from subroutine instruction and an instruction field specifying whether that particular microinstruction is a jump microinstruction, return microinstruction, or requires neither action;
at least three address registers one for each control memory and containing the address of the next microinstruction to be fetched;
means for fetching said microinstructions from each of said control memories in every clock cycle;
an instruction register coupled to the respective memories and digital device for receiving the control field and instruction field of a microinstruction fetched from one of said control memories;
a mulitplexor coupled between said respective control memories and said instruction register to select the instruction field and control field of one of the microinstructions being fetched from said respective control memories;
interconnection means coupled between each of said control memories and the address registers of the other control memories for supplying a jump address to the address registers of the other control memories;
logic means coupled to said instruction field portion of said instruction register and to said address registers specifying one of said registers as a program counter, one of said registers as the jump address register and one of said address registers as a return from subroutine register;
means responsive to said logic means to increment said program counter, to load a new address into said jump address register and to keep said return from subroutine register current contents; and
push-down stack means coupled to said address registers to receive one or more return from subroutine addresses in a first-in last-out manner to accommodate the execution of a series of nested subroutines.

9. A micrcontroller according to claim 8 wherein:
each of said control memories contain the same sets of microinstructions.

10. A microcontroller according to claim 8 futher including:
a plurality of multiplexors, one between each of said address registers and the jump address output of the other control memory, said multiplexors also being coupled to an outside source of microinstruction addresses.

11. A microcontroller according to claim 8 wherein:
each address register is a register counter that can be incremented to fetch, in order, a sequence of microinstructions from its corresponding control memory.

12. A microcontroller according to claim 8 wherein:
said logic circuit means specifies a different address register as a program counter according to whether the microinstruction currently being executed is a jump to subroutine microinstruction or a return from subroutine microinstruction.

13. A microcontroller according to claim 8 wherein:
said address registers are coupled to said push-down stack means so that the currently specified return from subroutine register serves as the first location in said stack means as a top of stack register.

* * * * *